Oct. 26, 1965     C. ROBERSON ETAL     3,214,053
VENTED ADAPTER FOR CONNECTING FEEDING NIPPLE TO END OF CAN
Filed Jan. 31, 1964     2 Sheets-Sheet 1

INVENTORS
CARL ROBERSON &
JOHN S. SONG

BY Mason, Porter, Willer & Stewart
ATTORNEYS

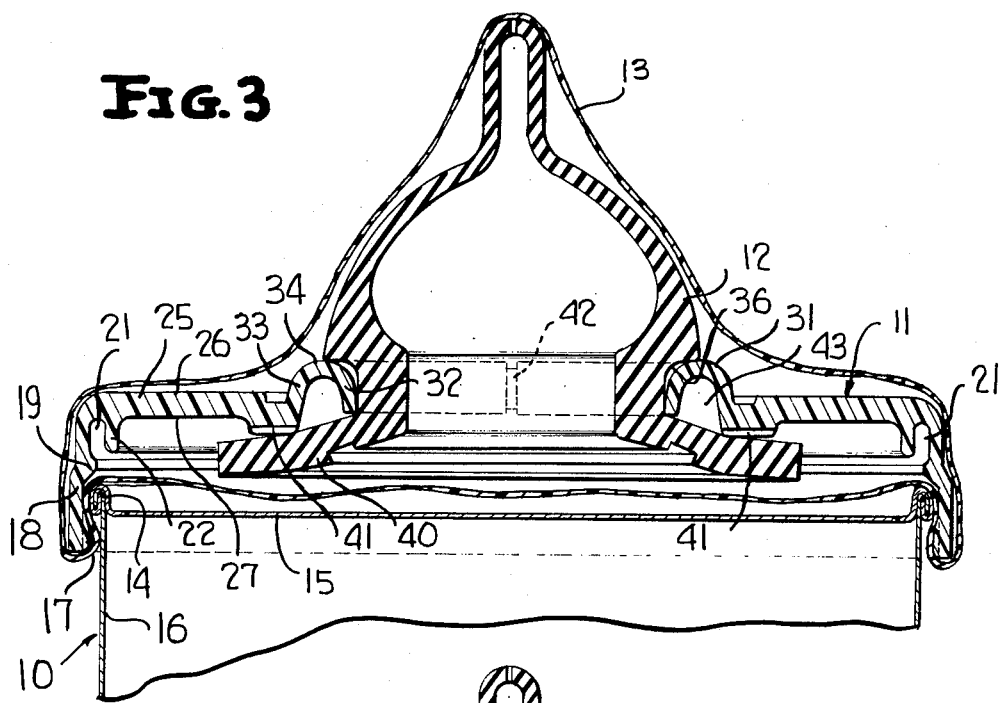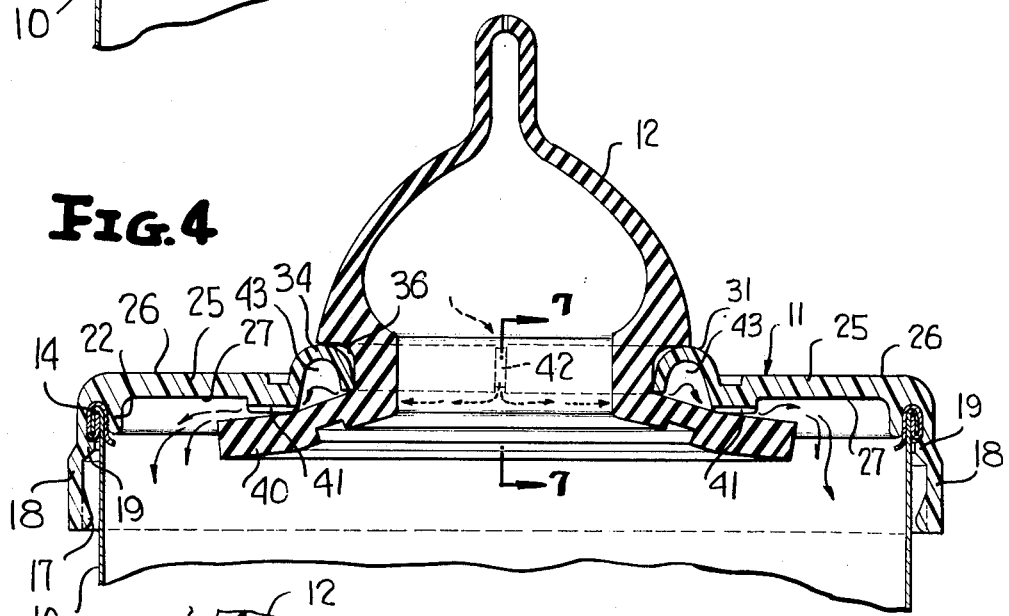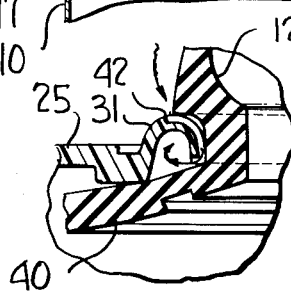

United States Patent Office 3,214,053
Patented Oct. 26, 1965

3,214,053
VENTED ADAPTER FOR CONNECTING FEEDING NIPPLE TO END OF CAN
Carl Robertson, Park Forest, and John S. Song, Addison, Ill., assignors to Continental Can Company, Inc., New York, N.Y., a corporation of New York
Filed Jan. 31, 1964, Ser. No. 341,679
8 Claims. (Cl. 215—11)

This invention relates to an adapter or cap for connecting a feeding nipple to one end of a can, or other container, and more particularly relates to the provision and arrangement of vent channels in the adapter or cap for permittting air to enter the can or container as the contents are withdrawn through the feeding nipple.

It is well known to market baby formulas in standard cans or containers. Snap fitted over the top of each can is a transparent, semi-rigid polypropylene adapter or cap fitted with a sterile rubber nipple. The complete attachment is sealed in a polypropylene film pouch and is securely affixed to the can by a snug cellulose band. The formula is prepared for feeding simply by removing the nipple-and-adapter unit, punching two holes in the top of the can and replacing the attachment. With previously known types of adapters or caps, it has been necessary to provide nipples which have vent holes formed therein. The vent holes are usually provided by piercing the nipples with heated pins. Such an operation usually causes a piece of scrap to be formed and these pieces of scrap are then air blown out of the nipples. It is undesirable to pierce the nipples to provide vent holes because it often happens that the piece of scrap for each hole adheres to the edge thereof and is not blown clear, thus resulting in the scrap pellet either obstructing the vent hole or later being dislodged and falling into the contents of the can or container. The two operations of piercing the nipples with heated pins and air blowing the scrap pellets not only add to the cost of manufacturing a nipple, but also increase the chances of contamination.

It is an object of this invention to provide an adapter or cap with vent channels so as to eliminate the necessity of having vent holes in the nipples and thereby eliminate two extra manufacturing operations and decrease the chance of contamination.

Another object of this invention is to provide an adapter or cap for use with a flexible nipple, the cap comprising an end wall having an outer surface and an inner surface, an aperture formed in the end wall and adapted to receive the flexible nipple therethrough, a first vent channel formed in the outer surface, and a second vent channel formed in the inner surface of the end wall in spaced relation to the first vent channel.

Another object of this invention is to provide an adapter or cap, of the type described above, which is provided with a skirt depending from the end wall and including means for providing a fluid-tight seal with a can or container.

Another object of this invention is to provide an adapter or cap, of the type described above, wherein the end wall includes a nipple retaining formation, which formation defines a passageway for fluid communication between the first and second vent channels.

Another object of this invention is to provide a cap for use with a flexible nipple, the cap comprising a wall having an outer surface and an inner surface, an aperture formed in the wall and adapted to receive the flexible nipple, a nipple retaining formation circumscribing the aperture, a first vent channel for communicating with the atmosphere and the nipple retaining formation, a second vent channel for communicating with the nipple retaining formation and the interior of a container, the first and second vent channels being spaced from each other, a passageway in the nipple retaining formation, the passageway providing for fluid communication between the first and second vent channels.

Another object of this invention is to provide an adapter or cap, of the type described above, wherein a shoulder portion is provided on the inner surface of the cap, the shoulder portion being spaced from the aperture by the nipple retaining formation and having the second vent channel formed therein.

A further object of this invention is to provide an adapter or cap, of the type described above, wherein the nipple retaining formation is substantially U-shaped in cross-section and includes an inner leg, an outer leg and a bight portion, with the first vent channel being formed in the bight portion and the inner leg.

A still further object of this invention is to provide an adapter or cap, of the type described above, wherein the first and second vent channels are disposed at staggered locations so as to provide a long route of air travel to prevent product leakage.

With the above and other objects in view that will hereinafter appear, the nature of the invention will be more clearly understood by reference to the following detailed description, the appended claimed subject matter and the several views illustrated in the accompanying drawings.

In the drawings:

FIGURE 3 is an enlarged vertical sectional view, taken on line 3—3 of FIGURE 1, and illustrates the manner in which the novel adapter or cap is assembled with a flexible nipple, and the manner in which the cap and nipple are protected from contamination while being attached to a container of food prepared for marketing.

FIGURE 4 is an enlarged vertical sectional view, taken on line 4—4 of FIGURE 2, and illustrates the adapter or cap affixed in operating position to the double end seam of a can, and shows a first vent channel communicating with the atmosphere and a second vent channel communicating with the interior of the can or container.

FIGURE 7 is an enlarged fragmentary sectional view, taken on line 7—7 of FIGURE 4, and shows the details of the vent channel which communicates with the atmosphere.

Figure 1:
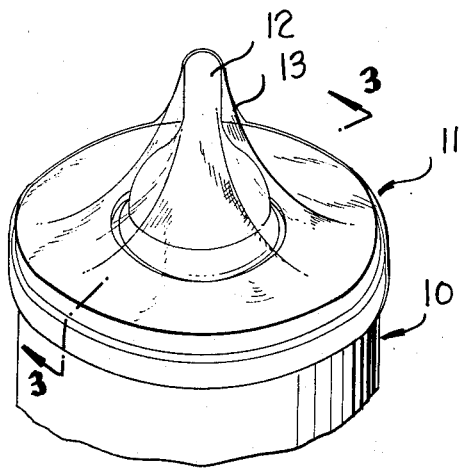
FIGURE 1 is a fragmentary perspective view of a marketable package embodying the present invention.
Figure 2:
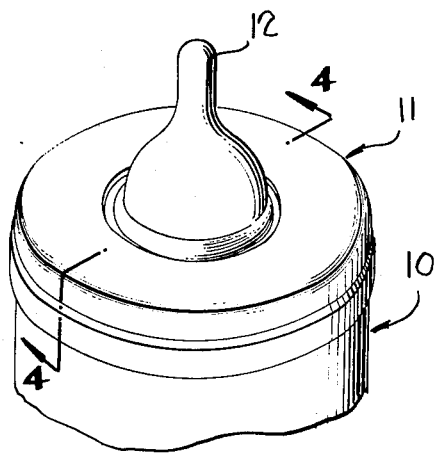
FIGURE 2 is a fragmentary perspective view, similar to FIGURE 1, and illustrates a baby feeding device assembled for use and embodying the present invention.
Figure 6:
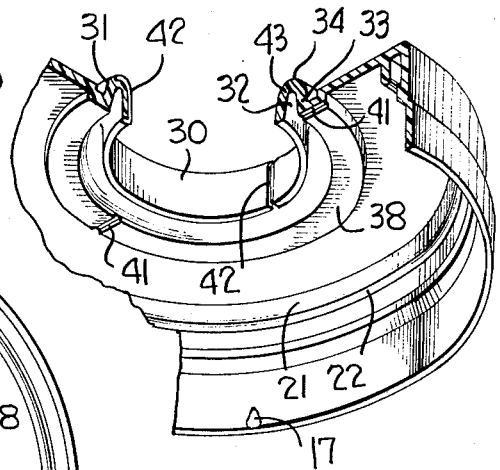
FIGURE 6 is a fragmentary perspective view of the adapter or cap and illustrates the arrangement of the vent channels therein.
Figure 5:
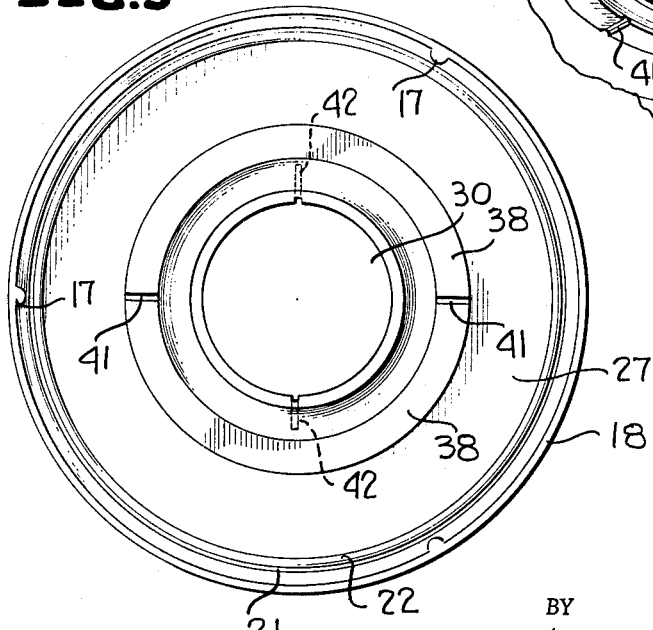
FIGURE 5 is a plan view of the underside of the novel adapter or cap.

Referring to the drawings in detail, there is shown a can or container, generally indicated by the numeral 10, and an adapter or cap, generally indicated by the numeral 11, which is used to attach a flexible nipple 12 to the can or container 10.

As is shown in FIGURES 1 and 3, the adapter or cap 11 and the nipple 12 are properly assembled and covered with a flexible plastic bag 13 which is preferably transparent and formed of polypropylene. As is shown in FIGURE 3, the can or container 10 is exemplified as being of the type having a double end seam 14 for attaching a can end 15 to a can body 16. The double end seam 14 of the can or container 10 cooperates with inwardly extending nibs or projections 17 which are provided on the lower end of a downwardly extending skirt 18 of the adapter or cap 11 for removably attaching the adapter or cap to the can or container 10. An inwardly extending annular bead 19 on the depending skirt 18, and the bulk of the plastic cover or bag 13, limits the downward position of the adapter or cap 11 in relation to the double end seam 14.

To ready the assembly for use, the adapter or cap 11, with the plastic bag 13 and flexible nipple 12, is forcibly pulled off the double end seam 14 of the can or container 10, the can or container 10 is opened by removing the can end 15 before which the contents may be warmed in the can, and the plastic bag 13 is removed from the adapter or cap 11 and the nipple 12.

Finally, the adapter or cap 11, without the plastic bag 13, is reassembled with the can 10 by forcing the adapter or cap 11 downwardly over the double end seam 14 until the end seam is fully received in an annular channel or pocket 21 between the skirt 18 and a depending spaced annular flange 22 in which position the double end seam 14 is retained by the inwardly extending annular bead 19 on the depending skirt 18, as is clearly shown in FIGURE 4.

In addition to the skirt 18 and the annular flange 22, the adapter or cap includes a wall 25 having an outer surface 26 and an inner surface 27. The wall 25, of the adapter or cap 11, has a central aperture 30 which is adapted to receive the flexible nipple 12 therethrough. The flexible nipple 12 is maintained in proper relation to the adapter or cap 11 by a nipple retaining formation 31 which circumscribes the aperture 30. The formation 31 is substantially U-shaped in cross-section and includes an inner leg 32, an outer leg 33 and a bight portion 34. The inner leg 32 and the bight portion 34 are snugly engaged with the flexible nipple 12 by being disposed in an outwardly open channel 36 of the flexible nipple 12. The adapter or cap 11 also includes an annular shoulder portion 38 on the inner surface 27 and adjacent to the nipple retaining formation 31. The annular shoulder portion 38 engages a base flange 40, of the nipple 12, and has a pair of vent channels 41 formed therein. A pair of vent channels 42 are formed in the inner legs 32 and bight portion 34, of the nipple retaining formation 31, and are spaced at a 90 degree relationship with respect to the vent channels 41.

As is clearly shown in FIGURE 4, the vent channels 41 communicate with the interior of the can or container 10 and with a passageway 43 which is defined by the nipple retaining formation 31. The vent channels 42 communicate with the atmosphere and with the passageway 43. This arrangement permits the entrance of air through the vent channels 42, into the passageway 43, through the vent channels 41 and into the container 10 as the contents are withdrawn through the nipple 12. This arrangement permits the entrance of air, but prevents the exit of liquid milk from the can 10 except when drawn through the nipple 12, thereby obviating the necessity for venting the nipple.

It is preferable that the adapter or cap 11 and the flexible plastic bag 13 each be made from substantially transparent polypropylene; however, other types of material may be used if so desired. Further, while the adapter or cap 11 is disclosed as being adapted to snap onto the double end seam of a conventional can, it is within the scope of this invention to provide the cap 11 with internal screw threads for attaching the cap to a conventional glass bottle or other container.

While preferred forms and arrangement of parts have been shown in illustrating the invention, it is to be clearly understood that various changes in details and arrangement of parts may be made without departing from the spirit and scope of the invention, as defined in the appended claimed subject matter.

We claim:

1. A cap for use with a flexible nipple, said cap comprising an end wall having spaced outer and inner surfaces, an aperture formed in said end wall and adapted to receive said flexible nipple therethrough, a first vent channel formed in said outer surface, a second vent channel formed in said inner surface of said end wall in spaced relation to said first vent channel, and passage means for placing said vent channels of said inner and outer surfaces in fluid communication.

2. A cap for use with a flexible nipple, said cap comprising an end wall having spaced outer and inner surfaces, an aperture formed in said end wall and adapted to receive said flexible nipple therethrough, a skirt depending from the end wall and including means for providing a fluid-tight seal with a container, a first vent channel formed in said outer surface, a second vent channel formed in said inner surface of said end wall in spaced relation to said first vent channel, and passage means for placing said vent channels of said inner and outer surfaces in fluid communication.

3. A cap for use with a flexible nipple, said cap comprising an end wall having spaced outer and inner surfaces, an aperture formed in said end wall and adapted to receive said flexible nipple therethrough, a first vent channel formed in said outer surface, and a second vent channel formed in said inner surface of said end wall in spaced relation to said first vent channel, said end wall including a nipple retaining formation, said formation defining a passageway for fluid communication between said first and second vent channels.

4. A cap as defined in claim 3 including a skirt depending from said end wall, said skirt including means for providing a fluid-tight seal with an end seam of a container.

5. A cap for use with a flexible nipple, said cap comprising a wall having an outer surface and an inner surface, an aperture formed in said wall and adapted to receive said flexible nipple, a nipple retaining formation circumscribing said aperture, a first vent channel for communicating with the atmosphere and said nipple retaining formation, a second vent channel for communicating with said nipple retaining formation and the interior of a container, said first and second vent channels being spaced from each other, a passageway in said nipple retaining formation, said passageway providing for fluid communication between said first and second vent channels.

6. A cap for use with a flexible nipple, said cap comprising a wall having an outer surface and an inner surface, an aperture formed in said wall and adapted to receive said flexible nipple, a nipple retaining formation circumscribing said aperture, a first vent channel for communicating with the atmosphere and said nipple retaining formation, a second vent channel for communicating with said nipple retaining formation and the interior of a container, said first and second vent channels being spaced from each other, a passageway in said nipple retaining formation, said passageway providing for fluid communication between said first and second vent channels, and a shoulder portion provided on said inner surface of said cap, said shoulder portion being spaced from said aperture by said nipple retaining formation and having said second vent channel formed therein.

7. A cap for use with a flexible nipple, said cap comprising a wall having an outer surface and an inner surface, an aperture formed in said wall and adapted to receive said flexible nipple, a nipple retaining formation circumscribing said aperture, a first vent channel for communicating with the atmosphere and said nipple retaining formation, a second vent channel for communicating with said nipple retaining formation and the interior of a container, said first and second vent channels being spaced from each other, a passageway in said nipple retaining formation, said passageway providing for fluid communication between said first and second vent channels, said nipple retaining formation being substantially U-shaped in cross-section and including an inner leg, an outer leg and a bight portion, said first vent channel being formed in said bight portion and said inner leg.

8. A cap for use with a flexible nipple, said cap comprising a wall having an outer surface and an inner surface, an aperture formed in said wall and adapted to receive said flexible nipple, a nipple retaining formation circumscribing said aperture, a first vent channel for communicating with the atmosphere and said nipple retaining formation, a second vent channel for communicating with said nipple retaining formation and the interior of a container, said first and second vent channels being spaced from each other, a passageway in said nipple retaining formation, said passageway providing for fluid communication between said first and second vent channels, said nipple retaining formation being substantially U-shaped in cross-section and including an inner leg, an outer leg and a bight portion, said first vent channel being formed in said bight portion and said inner leg, and a shoulder portion being provided on said inner surface of said cap, said shoulder portion being spaced from said aperture by said nipple retaining formation and having said second vent channel formed therein.

References Cited by the Examiner
UNITED STATES PATENTS

| | | | |
|---|---|---|---|
| 2,493,380 | 1/50 | Bailey | 215—11.3 |
| 3,115,980 | 12/63 | De Woskin | 215—11 |

FRANKLIN T. GARRETT, *Primary Examiner.*

UNITED STATES PATENT OFFICE
CERTIFICATE OF CORRECTION

Patent No. 3,214,053                           October 26, 1965

Carl Roberson et al.

It is hereby certified that error appears in the above numbered patent requiring correction and that the said Letters Patent should read as corrected below.

In the grant, line 1 and in the heading to the printed specification, line 4, for "Carl Robertson", each occurrence, read -- Carl Roberson --.

Signed and sealed this 10th day of May 1966.

(SEAL)
Attest:

ERNEST W. SWIDER                          EDWARD J. BRENNER
Attesting Officer                              Commissioner of Patents